Dec. 1, 1925.  
C. W. BISLAND  
1,563,464

GASKET FOR JAR COVERS

Filed June 4, 1921

Inventor  
C. W. Bisland

By  
Dorsey & Cole  
Attorneys

Patented Dec. 1, 1925.

1,563,464

UNITED STATES PATENT OFFICE.

CHESTER W. BISLAND, OF FREMONT, NEBRASKA.

GASKET FOR JAR COVERS.

Application filed June 4, 1921. Serial No. 475,034.

*To all whom it may concern:*

Be it known that I, CHESTER W. BISLAND, a citizen of the United States of America, and a resident of Fremont, county of Dodge, and State of Nebraska, have invented certain new and useful Improvements in Gaskets for Jar Covers, of which the following is a specification.

This invention is an improvement in gaskets for jar covers and the like.

The chief object of the invention is to provide a gasket or cushion which can be fitted over the open mouth of a jar or crock such, for instance, as a glass pickle jar of the type used in stores for displaying the ware, and which will operate as a cushioning means for the cover and as a means for rendering the jar or crock practically air tight and keeping the contents immune to entrance of insects.

Another object is to provide such a gasket which will fit jars in commercial use, without the necessity of providing the jars or their covers with a special seat for the gasket.

A further object is to provide a gasket of the nature described which will effectively operate to prevent chipping or cracking of the jar mouth or the cover and will prevent contact of the cover with the jar both while the cover is in place and while it is being placed on or removed from the jar.

With these and other objects in view which will appear as the description proceeds the invention resides in the construction, operation and arrangement of parts hereinafter more fully described and claimed and illustrated in the accompanying drawings in which like character of references indicate like parts throughout the several features and in which:

Referring more particularly to the drawings, 5 indicates a jar and 6 the cover therefor.

The gasket is annular in form, is preferably made with its various parts integral, and includes specifically a cushion 7, which is resilient and elastic, an elastic tube 8 above the cushion, and a depending skirt 9 which is also preferably elastic.

The cushion 7 by preference is slightly concaved transversely on its lower face so as to fit the wall of the jar at the mouth thereof, it being the usual practice in manufacturing jars to make the walls at the mouths of jars slightly rounded. The skirt 9 is offset laterally with respect to the cushion 7, and depends therefrom to and frictionally engages the outer walls of the receptacle adjacent the mouth thereof and serves the double function of retaining the gasket in place on the receptacle and of affording a bumper covering an area considerably below the mouth of the receptacle, which bumper will effectively prevent contact between the receptacle and its cover while the cover is being removed from or placed on the receptacle.

It is a matter of general observation that with receptacles of comparatively large size such as, for instance, receptacles commonly used in delicatessen and other stores in which pickles, crackers and other food stuffs are displayed, that in handling the covers of the receptacles it is almost an invariable thing that the cover is never gently placed directly down upon the top of the receptacle but it usually happens that the edge of the cover scrapes or strikes against the wall of the receptacle near the mouth of the latter. This results in a great deal of breakage either of the receptacle or of the cover, and furthermore it often results in a chipping of the receptacle or cover and the depositing of those chips in the contents of the receptacle. Both of these results are of course extremely undesirable. The bumper thus afforded by the skirt 9, protects a considerable area of the jar below its mouth, and prevents the contact of the cover with the jar in the ordinary handling of the cover.

The tube 8 is arranged preferably above the cushion 7 and while it may, if desired, contain air or suitable liquid, it is extremely elastic, and it acts as a medium on which the cover rests when in position. The elasticity of the tube takes up irregularities in the surface of the cover against which the tube contacts, and thus serves to render the jar practically air tight when the cover is in place. This intimate contact between the tube and the cover also prevents the entrance of insects to the contents of the jar, and thus retains the contents of the jar in a sanitary and clean condition.

Figure 3:
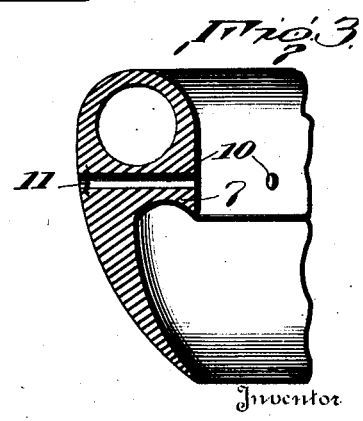
Figure 3 is an enlarged sectional view through a modified form of the gasket used when it is desired that the contents of the container be ventilated.
Figure 4:
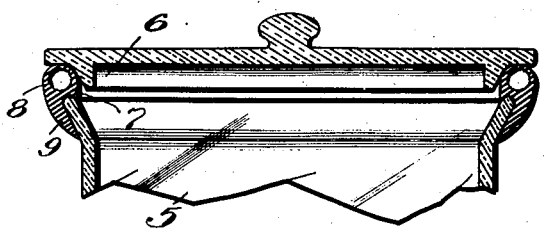
Figure 4 is a fragmentary sectional view through another type of jar and cover showing the gasket in use therewith.

Certain food products, to be properly kept, must be ventilated, and for jars in which these food products are to be kept, I provide a modified form of gasket. This form has a small passageway or tube 10 formed at one or more places in it, these passageways extending through the cushioned portion 7 of the gasket from the inner to the outer side thereof. When the ventilating tubes or passages 10 are made of such a size as to render the contents of the container liable to invasion by insects, screens 11 of fine mesh may be placed at the outer or inner end, or both, of the passageway, to exclude insects. These screens may be held in place in various ways, one of which is to slightly force apart the walls of the passage 10 and then insert the screen into the passage, and allow the walls to contact about the screen, thus holding the latter in place as illustrated in Figure 3.

Figure 1:
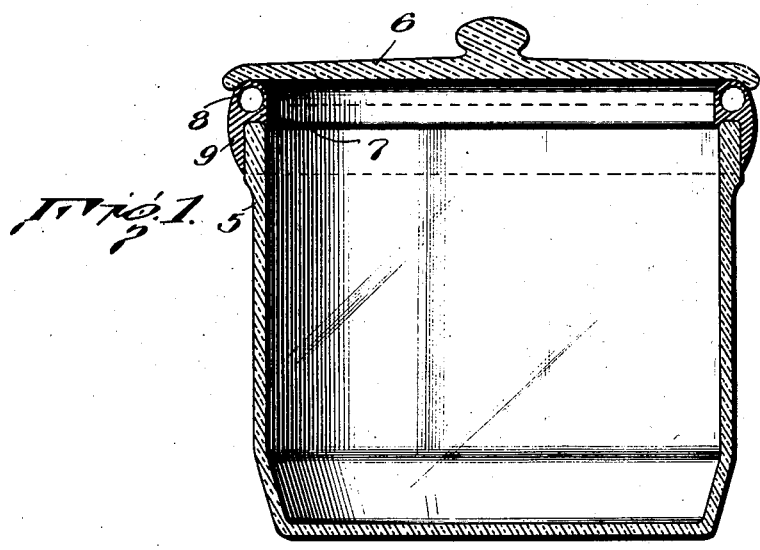
Figure 1 is a sectional view through a jar showing the gasket in place and the cover fitted thereon.
Figure 2:
Figure 2 is a sectional view through the gasket removed.

It will be observed from Figure 2 that the skirt 9 of the gasket, when the gasket is not in place on a receptacle, converges in a conical manner downwardly. This is for the purpose of allowing the gasket to fit receptacles of somewhat varying diameter, and to fit receptacles with different shaped mouths. Some receptacles have the mouths slightly flaring, others have them straight up and down, others have the walls of the mouths slightly inclining inwardly, and others have them slightly beaded around the lateral edges of the mouths of the receptacles at the tops thereof. All of these forms the gasket will fit.

Although I have described the preferred construction of my invention, the invention is capable of various minor modifications without departing from the spirit of the invention and it is to be understood that the claims are to be given the broadest construction of which they are susceptible in view of the prior art.

Having thus described my invention what I claim and desire to secure by Letters Patent is:—

1. The combination with a receptacle, of a gasket comprising a cushion resting on the walls of the receptacle at the mouth thereof, an elastic tube supported on the cushion, and an elastic skirt depending from the cushion and frictionally engaging the outer walls of the receptacle adjacent the mouth thereof.

2. The combination with a receptacle and its cover, of a gasket including a cushion resting on the walls of the receptacle at the mouth thereof, an elastic tubular member supported on the cushion and on which the cover rests, and an elastic skirt depending from the cushion and frictionally engaging the walls of the receptacle adjacent the mouth thereof.

3. A cushioning gasket for jar covers comprising a cushion, a tube formed integrally therewith and positioned thereabove, and a skirt formed integrally with the cushion and depending therefrom.

4. A cushioning gasket comprising a tubular elastic cushioning member and an elastic skirt depending therefrom.

5. A cushioning gasket comprising a tubular cushioning member, a cushion supporting the tubular member, and a skirt carried by the cushion.

6. A cushioning gasket comprising a skirt for frictionally engaging the walls of a receptacle near the mouth thereof, and a tubular cushioning member carried by the skirt and offset therefrom.

7. A cushioning gasket comprising a cushioning member formed, before its application to a receptacle, with a skirt depending therefrom and offset from one side thereof and converging in a conical manner downwardly, said skirt being elastic and expansible and tapering off to a thin lower edge, whereby it may be fitted to the mouths of receptacles of different sizes and configurations.

8. A cushioning gasket comprising a cushioning member, a cushion supporting the cushioning member, a skirt carried by the cushion, and ventilating means afforded by the cushion between the cushioning member and the skirt.

9. A cushioning gasket comprising an elastic cushioning member formed, before its application to a receptacle, with an elastic skirt depending therefrom and offset from one side of the cushioning member, said skirt tapering off to a thin edge at its lower extremity.

10. As an article of manufacture, a cushioning gasket comprising an elastic cushioning member having an elastic skirt off-set from one side of the cushioning member, and being expansible for fitting the mouths of receptacles of different sizes and configurations, said skirt being of a general conical configuration and tapering to a thin lower edge.

In testimony whereof I hereunto affix my signature.

CHESTER W. BISLAND.